United States Patent [19]

Nakagawa et al.

[11] 4,260,437

[45] Apr. 7, 1981

[54] STABILIZERS FOR SOLID PROPELLANT BINDERS

[75] Inventors: Toshio W. Nakagawa, San Jose; Thomas P. Rudy, Saratoga, both of Calif.

[73] Assignee: United Technologies Corporation, Hartford, Conn.

[21] Appl. No.: 36,129

[22] Filed: May 4, 1979

Related U.S. Application Data

[63] Continuation of Ser. No. 539,209, Jan. 7, 1975, abandoned, which is a continuation of Ser. No. 325,275, Jan. 22, 1973, abandoned.

[51] Int. Cl.$^3$ ............................................. C06B 45/10
[52] U.S. Cl. ................................... 149/19.9; 149/19.1; 149/19.91; 149/19.92; 260/465.4; 562/593; 562/595; 568/701
[58] Field of Search ................... 149/19.1, 19.9, 19.91, 149/19.92; 260/465.4; 562/593, 595; 568/701

[56] References Cited

U.S. PATENT DOCUMENTS

| 3,248,410 | 4/1966 | Berenbaum | 149/19.91 |
|---|---|---|---|
| 3,309,348 | 3/1967 | Wentz, Jr. | 149/19.9 |
| 3,388,141 | 6/1968 | Berenbaum | 149/19.9 |
| 3,677,839 | 7/1972 | Sayles | 149/19.9 |
| 3,698,969 | 10/1972 | Fein et al. | 149/19.9 |
| 3,793,098 | 2/1974 | Inoue et al. | 149/19.8 |
| 3,867,354 | 2/1975 | Betts et al. | 149/19.9 |
| 3,884,736 | 5/1975 | Stack | 149/19.8 |
| 3,953,260 | 4/1976 | Braun et al. | 149/19.92 |

OTHER PUBLICATIONS

Grant, "Hackh's Chemical Dictionary," 4th Ed., p. 687, McGraw Hill Book Company (1969), New York.
Cotton et al., "Advanced Inorganic Chemistry," 3rd Edition, pp. 528–530, Interscience Publishers (1972), New York.

*Primary Examiner*—Edward A. Miller
*Attorney, Agent, or Firm*—Steven F. Stone

[57] ABSTRACT

Metals such as copper and the transition elements may give rise to serious problems in conventional rubber based solid propellant binders. These metals may accelerate the curing action to such a degree that the pot life of the freshly mixed propellant is reduced. Also the metals may promote oxidative degradation of cured and uncured binder systems. These undesirable effects can be prevented by adding to the uncured binder certain binder soluble agents which are capable of forming stable complexes with the undesirable metals in which the valence of the metal ion is fixed. A wide variety of chelating agents can be used and include, particularly, the condensation products of salicylaldehyde with aliphatic di- and polyamines and with o-aminophenols.

18 Claims, No Drawings

STABILIZERS FOR SOLID PROPELLANT BINDERS

This is a continuation, of application Ser. No. 539,209, filed Jan. 7, 1975, now abandoned, which in turn, was a continuation of 325,275, filed Jan. 22, 1973, now abandoned.

BACKGROUND OF THE INVENTION

In the preparation of typical composite solid propellants, a liquid crosslinkable polymeric substance is used as a vehicle for the dispersing of the particulate oxidizer material, burning rate catalyst, solid fuel, plasticizer and other materials normally incorporated into a crosslinked composite propellant. A crosslinking agent for the liquid polymer is added to the system and, after mixing, the mixed uncured propellant is cast into a suitable form and cured under the desired conditions of temperature and pressure. State-of-the-art propellant systems normally employ functionally active polymers such as the polybutadiene-acrylic acid-acrylonitrile polymers (PBAN), epoxy, hydroxy, and carboxy functional polybutadienes, polyisobutylenes, polyethers and polyesters. The crosslinking agents for these materials are commercially available compounds having the activity required by the particular functional group chosen. For example, if carboxyfunctionality is used in the polymer, an aziridinyl or epoxy crosslinking agent could be used. If hydroxyfunctionality is used in the polymer, an isocyanate crosslinking agent could be used. If epoxyfunctionality is used in the polymer, a carboxy crosslinking agent could be used all as is known to the art.

In the manufacture of these propellants, it is sometimes necessary to add combustion catalysts which derive their activity from the presence of iron. The iron may be present in the form of iron oxide or as ferrocene or a ferrocene derivative, for example. Other combustion catalysts involve the use of copper oxide, copper salts and compounds of various transition metals. Further, due to the equipment and ingredients used in the processing of a propellant, it is almost impossible to obtain a mix which is totally free of these metals even if compounds of these materials are not specifically added to the mix for any particular purpose.

It has been found that the presence of these metals can so accelerate the curing action of the propellant that it is impossible to mix the material together to the desired degree of dispersion without the viscosity increasing to the point where it is no longer possible to cast the mixture into a suitable configuration. It has also been found that even if the pot life can be extended sufficiently to permit the casting of the propellant, the presence of these metals tends to promote the subsequent degradation of the cured binder. This degradation is most commonly manifested by discoloration, hardening, or embrittlement of the propellant, particularly when the propellant is stored at temperatures higher than ambient in the presence of atmospheric oxygen. It appears most likely that these metals cause the undesirable effects on the cure by a catalysis of the cure reaction and the degradation of the propellants by the catalysis of oxidation reactions.

According to this invention, the undesirable effects of these metals may be alleviated without destroying their effectiveness as combustion catalysts, if they have been added for that purpose, by adding a binder soluble agent to the binder mixture which agent is capable of reacting with the undesirable metals to form stable complexes in which the valence of the metal ion is fixed. This renders the metal inactive as a cure or oxidation catalyst without affecting the activity as a combustion catalyst.

DESCRIPTION OF THE INVENTION

According to this invention, chelating agents for copper and transition element metals, which chelating agents are soluble in the liquid polymers and do not have an adverse effect on the cure of the polymer, are added to the polymer to extend the pot life of the uncured propellant and to prevent oxidative degradation of the cured polymeric system. The chelating agents need not be added in substantial amounts and in practice it has been found that less than 2% by weight of binder (less than approximately 0.3% by weight of propellant) of the chelating agent is adequate to obtain the desired results. The normal range for the chelating agent, depending upon the amount of metal ion to be chelated, is in the range of 0.001% to 0.05% by weight of the overall mixture. Suitable chelating agents include the condensation products of salicylaldehyde with o-aminophenols or aliphatic di and polyamines. Suitable o-aminophenols include salicylidene-o-aminophenol, salicylidene-2-amino-4-nonylphenol and other 2-aminophenols bearing alkyl substituents in the 4 and/or 5 position. The salicylaldehyde (i.e. 2-hydroxybenzaldehyde) moiety of such chelating agents may also bear alkyl substituents in the 4 and/or 5 position. Tetrakis(-salicylideniminomethyl)methane (TSMM) is a particularly effective example of chelators prepared by the condensation of salicylaldehyde with polyfunctional aliphatic amines. Disalicylidene-1,2-propylenediamine (DSPD) representing the condensation products with an aliphatic diamine, is effective in suppressing the undesirable catalytic effects of copper impurities but is not useful against iron catalysis. All of the above materials are either commercially available or can be readily prepared by a chemist using techniques known to the state of the art. The condensation products of the salicylaldehydes and all the amines or aminophenols are simply prepared by the direct reaction of the aldehyde with an equivalent amount of the amino compound in an appropriate solvent. In some cases it may be desirable to purify the crude condensation product by recrystallization. The particular alkyl moieties in the above materials are not critical to their effectivity, the general effect being an increase in oil solubility and a decrease in specific activity as the length of the alkyl group increases.

The particular aliphatic group contained in the aliphatic diamines is not as significant as the location of the amino groups; it having been found that the amino groups should be located on adjacent carbon atoms. For example, 1,2-propylenediamine produces a better metal deactivator than 1,3-propylenediamine. Thus for practical reasons, it is prefered to use appropriate lower aliphatic diamines such as ethylene diamine and 1,2-propylenediamine.

The situation with respect to the polyamines is more complex since both the length of the chain and the number of amino groups vary. The prefered aliphatic polyamines should have 3 or 4 closely spaced amino groups and once this is achieved increasing chain length is expected to increase the solubility of the metal deactivators in the polymers to which they will be added while increasing the number of amino groups is expected to decrease the solubility. Suitable aliphatic polyamines include tetrakis(aminomethyl)methane; 1,1,1-tris-(aminomethyl)ethane and 1,1,2,2-tetrakis-(aminomethyl)ethane for example.

PREPARATION OF CHELATORS

DSPD

Disalicylidene-1,2-propylenediamine is commercially available from E. I. du Pont de Nemours & Co.

(SOA)

A solution of 109 gm (1.0 mole) of o-aminophenol in 800 ml of methanol is placed in a 2-liter, 3-necked flask equipped with a reflux condenser, addition funnel and stirrer. Salicylaldehyde (122 gm., 1.0 mole) is placed in the addition funnel and added dropwise over a period of one hour to the stirred reaction mixture. With continued stirring the reaction mixture is then heated to reflux and maintained at that temperature for an additional hour. The reaction mixture is then cooled to room temperature, and the crude product is collected by filtration. The crude product is purified by recrystallization from a mixed solvent consisting of two volumes of chloroform to one volume of benzene. After the recrystallized product is dried in vacuum, it exhibits a melting point of 184° C. The yield of recrystallized product is 160 gm (75%).

SOAPNP

A solution of 59 gm (0.25 mole) of 2-amino-4-nonylphenol and 34 gm (0.25 mole) of salicylaldehyde in 250 ml. of benzene is refluxed for two hours. The resulting mixture is refluxed with 10 gm of activated charcoal, filtered to remove the charcol, and then stripped of solvent in a rotating vacuum evaporator heated by water bath at 60° C.

TSMM

To a solution of 1.0 gm (0.00305 mole) of pentaerythrityltetramine disulfate in 25 ml. of water sodium bicarbonate is added in small increments until the solution is neutral. To the solution 40 ml. of ethanol is added followed by 1.49 gm. (0.0122 mole) of salicylaldehyde. The reaction mixture is warmed on a hot plate and maintained at a temperature of 50°–60° C. until formation of yellow precipitate is complete. The product is collected by filtration, washed with a 50% aqueous solution of ethanol, and then dried in vacuum. The yield of product melting at 167°–169° C. is 1.3 gm (78%).

EXAMPLE I

Gumstock samples of PBAN were prepared from samples containing 0.055% by weight of iron (Sample A) and 0.015% by weight of iron (Sample B). The binder gumstock formulations for both Samples A and B were 0.5 equivalents of PBAN, 0.5 equivalents of nadic methyl anhydride, 1.3 equivalents of Dow epoxide resin DER-332 and 15% by weight of dioctyl adipate. The gelation times for the formulations were determined at 70° C. using a Sunshine gel timer. The following table shows the effect of the addition of 2% by weight of SOA in the formulation.

| PBAN Sample | SOA (% w) | Gel Time (hr.) |
| --- | --- | --- |
| A | None | 4.4 |
| B | None | 6.3 |
| A | 2.0 | 8.8 |

-continued

| PBAN Sample | SOA (% w) | Gel Time (hr.) |
| --- | --- | --- |
| B | 2.0 | 7.1 |

The gel time of Sample A was increased to a useful value and the gel time of Sample B was extended substantially.

EXAMPLE II

An epoxy cured carboxyterminated polybutadiene propellant containing copper chromite combustion catalyst exhibited an unacceptable surface hardening after only two weeks of storage in air at 160° F. When 0.05% by weight of DSPD was added to the formulation the propellant was able to withstand one year of storage in air at 160° without exhibiting unacceptable surface hardening.

EXAMPLE III

The effect of three chelators on the gel time of hydroxyterminated polybutadiene (HTPB) gumstocks containing HYCAT 6 combustion catalyst were determined on the basis of a formulation comprising 1.0 equivalent of Arco Poly B-D R-45M HTPB; 0.8 equivalent of dimeryl diisocyanate (DDI); 0.7% by weight of t-butylhydroquinone and 14% by weight of HYCAT®-6, an organoiron burning rate catalyst. The effect of the use of the chelators on gel time are shown in the following table:

| Chelator (% w) | Gel Time (hr.) |
| --- | --- |
| None | 13.1 |
| SOA (¼) | 40.8 |
| SOAPNP (¼) | 27.6 |
| TSMM (¼) | 34.0 |

As can be seen, all samples benefited by an extension of gel time.

EXAMPLE IV

A large number of propellant formulations comprising isocyanate cured hydroxyterminated polybutadiene propellants containing ammonium perchlorate oxidizer, aluminum powder fuel and HYCAT burning rate catalysts were prepared. These propellant formulations all contained approximately 70% by weight of ammonium perchlorate, 16% by weight aluminum and 2% by weight of organoiron burning catalyst with the remainder being various proportions of polymer crosslinking agents and plasticizers together with quantities ranging from the 0.01% to 0.04% by weight of SOA, SOAPNP and TSMM. In all cases the incorporation of these compounds resulted in an extension of pot life and the resultant propellants all exhibited a greater resistance to oxidation than when no additive was used.

We claim:
1. A composition of matter comprising:
   (a) a liquid crosslinkable polymeric system selected from the group consisting of hydroxyterminated polybutadiene, carboxyterminated polybutadiene, and polybutadiene-acrylic acid-acrylonitrile polymers, the cure time of which is decreased by the presence of materials containing elements selected from the group consisting of copper and iron; and
   (b) a chelating agent for said elements dissolved in said polymeric system which chelating agent is non-reactive with said polymeric system in the amounts present, capable of forming a stable chelate with said elements in which the valence of the metal ion is fixed, and is a condensation product of salicylaldehyde and a material selected from the group consisting of o-aminophenol, o-amino-p-nonylphenol, ethylenediamine, 1,2-propylenediamine and tetrakis(aminomethyl)methane.

2. The composition of claim 1 wherein said chelating agent is salicylidene-o-aminophenol.

3. The composition of claim 1 wherein said chelating agent is salicylidene-o-amino-p-nonylphenol.

4. The composition of claim 1 wherein said chelating agent is tetrakis(salicylideniminomethyl)methane.

5. The composition of claim 1 wherein said chelating agent is disalicylidene-1,2-propylenediamine.

6. The composition of claim 1 further comprising particles of a solid inorganic oxidizing agent dispersed through said composition.

7. A method for extending the pot life of a liquid crosslinkable polymeric system selected from the group consisting of hydroxy-terminated polybutadiene, carboxyterminated polybutadiene, and polybutadiene-acrylic acid-acrylonitrile polymers, the cure time of which polymeric systems is decreased by the presence of materials containing elements selected from the group consisting of copper and iron, which comprises adding to the crosslinkable polymeric system a chelating agent for said elements, which chelating agent is soluble in the polymeric system, non-reactive therewith in the amounts present and capable of forming a stable chelate with said elements in which the valence of the metal ion is fixed, which chelating agent is a condensation product of salicylaldehyde and a material selected from the group consisting of o-aminophenol, o-amino-p-nonylphenol, ethylenediamine, 1,2-propylenediamine and tetrakis(aminomethyl)methane.

8. The method of claim 7 wherein said chelating agent is salicylidene-o-aminophenol.

9. The method of claim 7 wherein said chelating agent is salicylidene-o-amino-p-nonylphenol.

10. The method of claim 7 wherein said chelating agent is disalicylidene-1,2-propylenediamine.

11. The method of claim 7 wherein said chelating agent is tetrakis-(salicylideniminomethyl)methane.

12. The method of claim 7 wherein said crosslinkable polymeric system contains particles of a solid inorganic oxidizing agent dispersed therethrough.

13. A method of extending the pot life of a liquid, crosslinkable polymeric system, the cure time of which is decreased by the presence of transition element metals which method comprises adding to the crosslinkable polymeric system a chelating agent for said metal, which chelating agent is soluble in the polymeric system, non-reactive therewith in the amounts present, capable of forming a stable chelate with said metal in which the valence of the metal ion is fixed, which chelating agent is selected from the group consisting of a condensation product of salicylaldehyde and a material selected from the group consisting of o-aminophenol, o-amino-p-nonylphenol, ethylenediamine, 1,2-propylenediamine and tetrakis(aminomethyl)methane.

14. The method of claim 13 wherein the chelating agent is salicylidene-p-aminophenol.

15. The method of claim 13 wherein said chelating agent is salicylidene-o-amino-p-nonylphenol.

16. The method of claim 13 wherein said chelating agent is tetrakis-(salicylideniminomethyl)methane.

17. The method of claim 13 wherein said chelating agent is disalicylidene-1,2-propylenediamine.

18. The method of claim 13 wherein said crosslinkable polymeric system contains particles of a solid inorganic oxidizing agent dispersed therethrough.

* * * * *